United States Patent
Fyie et al.

(10) Patent No.: US 8,688,339 B2
(45) Date of Patent: Apr. 1, 2014

(54) METHOD AND SYSTEM FOR PROVIDING A NEUTRAL TOW MODE IN A SHIFT-BY-WIRE TRANSMISSION

(75) Inventors: Matthew Luke Fyie, Canton, MI (US); Todd Curtis Spaulding, Ann Arbor, MI (US); Brian J Deurloo, Howell, MI (US); Mark Edward Zyskowski, Dearborn, MI (US); Charles C Poon, Canton, MI (US); William Russell Goodwin, Farmington Hills, MI (US); Christopher Lee Danks, Northville, MI (US); Richard Reynolds Hathaway, Livonia, MI (US); Jeffrey James Tumavitch, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 13/315,965

(22) Filed: Dec. 9, 2011

(65) Prior Publication Data

US 2013/0151096 A1    Jun. 13, 2013

(51) Int. Cl.
*F16H 61/00* (2006.01)
*F16H 61/18* (2006.01)

(52) U.S. Cl.
USPC .................. 701/62; 701/36; 701/51; 701/64; 477/34

(58) Field of Classification Search
None
See application file for complete search history.

(56) References Cited

U.S. PATENT DOCUMENTS

| | | | |
|---|---|---|---|
| 2,610,518 A | 9/1952 | Goedeke et al. | |
| 2,933,945 A | 4/1960 | Brewster et al. | |
| 3,141,350 A | 7/1964 | Bavacqua et al. | |
| 3,937,105 A | 2/1976 | Arai et al. | |
| 4,884,057 A | 11/1989 | Leorat | |
| 4,892,014 A | 1/1990 | Morell et al. | |
| 5,085,106 A * | 2/1992 | Bubnash | 74/335 |
| 5,433,124 A | 7/1995 | Person | |
| 5,437,204 A | 8/1995 | Person | |
| 5,522,776 A * | 6/1996 | Alvey | 477/35 |
| 5,696,679 A | 12/1997 | Marshall et al. | |
| 5,758,304 A | 5/1998 | Bray | |
| 6,056,669 A | 5/2000 | Marshall | |
| 6,139,468 A | 10/2000 | Goates et al. | |
| 6,253,138 B1 | 6/2001 | Shober et al. | |
| 6,345,224 B1 * | 2/2002 | Schumacher et al. | 701/69 |
| 6,378,393 B1 | 4/2002 | Bates | |
| 6,487,484 B1 | 11/2002 | Shober et al. | |
| 6,661,114 B2 | 12/2003 | Syamoto | |
| 6,996,465 B2 | 2/2006 | Kim | |

(Continued)

FOREIGN PATENT DOCUMENTS

GB    2441337    5/2008

*Primary Examiner* — Behrang Badii
*Assistant Examiner* — Demetra Smith-Stewart
(74) *Attorney, Agent, or Firm* — Diederiks & Whitelaw, PLC

(57) ABSTRACT

A method and system provides a Neutral Tow mode in a vehicle with a shift-by-wire transmission by displaying a Neutral Tow mode option when the transmission control mechanism has been used to select Park, an ignition switch is on, and an engine is off or an information button has been pushed and entering a Neutral Tow mode upon detecting a triggering event. The Neutral Tow mode is canceled upon detecting a certain sequence of events, such as turning on the ignition switch, depressing and holding a brake pedal, and selecting Park. When in Neutral Tow mode the transmission will stay in Neutral, without automatically shifting to Park or using battery power, thereby enabling the vehicle to be towed long distances without draining battery power.

20 Claims, 4 Drawing Sheets

(56) References Cited

U.S. PATENT DOCUMENTS

| | | |
|---|---|---|
| 7,139,652 B2 | 11/2006 | Kikuchi |
| 7,143,857 B2 | 12/2006 | Ichikawa et al. |
| 7,156,218 B2 | 1/2007 | Yamamoto |
| 7,216,025 B2 | 5/2007 | Keyse et al. |
| 7,349,770 B2 | 3/2008 | Matsuzaki et al. |
| 7,566,289 B2 | 7/2009 | Inoue et al. |
| 7,571,662 B2 | 8/2009 | Pickering et al. |
| 2004/0173431 A1 | 9/2004 | De Vore et al. |
| 2006/0229789 A1 | 10/2006 | Krishman et al. |
| 2007/0262854 A1* | 11/2007 | Colburn et al. ............... 340/438 |
| 2008/0173121 A1 | 7/2008 | Kimura et al. |
| 2008/0242506 A1 | 10/2008 | Hori et al. |
| 2009/0111647 A1 | 4/2009 | Hecht et al. |
| 2009/0111648 A1 | 4/2009 | Hecht et al. |
| 2009/0111649 A1 | 4/2009 | Hecht et al. |
| 2009/0111654 A1 | 4/2009 | Hecht et al. |
| 2009/0120222 A1 | 5/2009 | Kimura et al. |
| 2009/0271080 A1 | 10/2009 | Pickering et al. |
| 2009/0287383 A1 | 11/2009 | Fujii et al. |
| 2011/0087386 A1* | 4/2011 | Steinhauser et al. ............... 701/2 |
| 2012/0078478 A1* | 3/2012 | Spaulding et al. ............... 701/53 |

* cited by examiner

METHOD AND SYSTEM FOR PROVIDING A NEUTRAL TOW MODE IN A SHIFT-BY-WIRE TRANSMISSION

BACKGROUND OF THE INVENTION

1. Field of Invention

The present invention pertains to the field of automatic transmissions for motor vehicles and; more particularly, to a method and system for providing a Neutral Tow mode in a shift-by-wire transmission.

2. Background of the Invention

A traditional automatic transmission includes a transmission control device employed to control the transmission of a motor vehicle. The transmission control device is used to select several ranges, such as Park, wherein the transmission is locked to prevent the vehicle from moving, Neutral, wherein the transmission allows the vehicle to be moved freely, such as, when being towed, Reverse, wherein the transmission allows the vehicle to move backwards, and one or more Drive ranges that enable forward motion of the vehicle. Usually, the transmission control device is in the form of a lever connected with a mechanical connection, such as a cable or a hydraulic line, to the transmission. Typically, the lever is also connected to an indicator. As the transmission control mechanism is moved from one range to another, the mechanical connection physically shifts the transmission to the selected setting and the indicator moves to show the driver which range has been selected. Even if the vehicle is turned off, the driver is able to determine the current transmission range from the indicator and, in some cases, is able to move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements although more commonly they are referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased. Various planetary gear configurations are found in modern automatic transmissions. However, the basic principle of shift kinematics remains similar. Shifting an automatic transmission having multiple planetary gearsets is accompanied by applying and/of releasing friction elements to change speed and torque relationships by altering the torque path through the planetary gearsets. Friction elements are usually actuated either hydraulically or mechanically based on the position of the transmission control device.

In a shift-by-wire transmission arrangement, the mechanical connection between the transmission control device and the transmission is eliminated. Instead, the transmission control device transmits an electrical signal along a wire to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., a series of buttons, lever or knob) that is used to instruct the transmission to switch between the transmission ranges. An electronic display, powered by a battery on the vehicle, is typically employed to indicate the current range for the transmission and must be on, and thus drawing power, in order for the driver to know which range has been selected.

Many vehicles with a shift-by-wire transmission incorporate a "Return to Park" feature to automatically shift the transmission into Park when the driver exits the vehicle or the battery supplies a voltage below a certain threshold level. See, for example, U.S. Pat. Nos. 3,937,105, 4,892,014 and 7,156,218. Such a feature is activated when certain triggering events occur, for example, when the system detects a seat belt being unbuckled while a driver door is opened, when the vehicle is traveling below a calibrated speed, or when the ignition is turned off. Automatically shifting the transmission into Park prevents unwanted motion of the vehicle.

While such a feature is helpful under most driving conditions, the feature is not helpful when the driver would like to exit the vehicle and have the vehicle remain in Neutral. In many vehicles, because of regulatory requirements, the electronic display must be on when the transmission is in any gear setting other than Park. Therefore, if the driver puts the transmission in Neutral in order to tow the vehicle, the electronic display will remain on and eventually drain the battery as the vehicle is being towed for long distances, for example when the vehicle is being towed behind a recreational vehicle on a cross country trip.

As can be seen by the above discussion, there exists a need for a way to keep the transmission in the Neutral gear setting even if the driver exits the vehicle and to further not cause the battery to be drained during towing.

SUMMARY OF THE INVENTION

The present invention is directed to a system for providing a Neutral Tow mode for a shift-by-wire transmission that is placed in various shift ranges such as Park, Drive, and Neutral and has an automatic Return to Park feature for shifting the transmission to Park when the vehicle is traveling at an extremely low speed or in a stopped condition as a driver prepares to exit the vehicle. The system includes a transmission control mechanism for determining which of the transmission ranges or modes is desired by the driver. A controller is used to receive information from various sensors, such as a door opening sensor, a seat belt sensor, an ignition switch sensor and the transmission control mechanism to determine when to shift the transmission into the various ranges and modes.

In a preferred embodiment, a Neutral Tow mode keeps the transmission from automatically shifting to Park for relatively long periods of time and does not require that the system be powered in order to allow the vehicle to be towed for long distances without draining the battery. The Neutral Tow mode is entered by the controller following a two-stage process wherein first a Neutral Tow option is displayed and then, when the option is selected, the Neutral Tow mode is engaged. The system has a display for displaying a Neutral Tow option when the transmission control mechanism has been used to select Park, the ignition switch is on, and the engine is off or an information button has been pushed. The display is active only for a limited amount of time after the Neutral Tow mode is entered, a door is opened, or the ignition switch is turned on so that power is not drained from the vehicle. The controller is further configured to enter the Neutral Tow mode upon detecting when the Neutral Tow option has been selected, when the foot brake has been depressed, and when the transmission has been shifted to Neutral. The controller is configured to keep the transmission in Neutral and not automatically shift to Park upon detecting a triggering event and configured to cancel the Neutral Tow mode upon detecting a certain sequence of events. The triggering event is preferably constituted by detecting that an ignition switch has been turned off, the driver has exited the vehicle or a parking brake has been released. The sequence of events includes at least two of the group consisting of: turning on the ignition switch, depressing and holding a brake pedal; and selecting Park.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
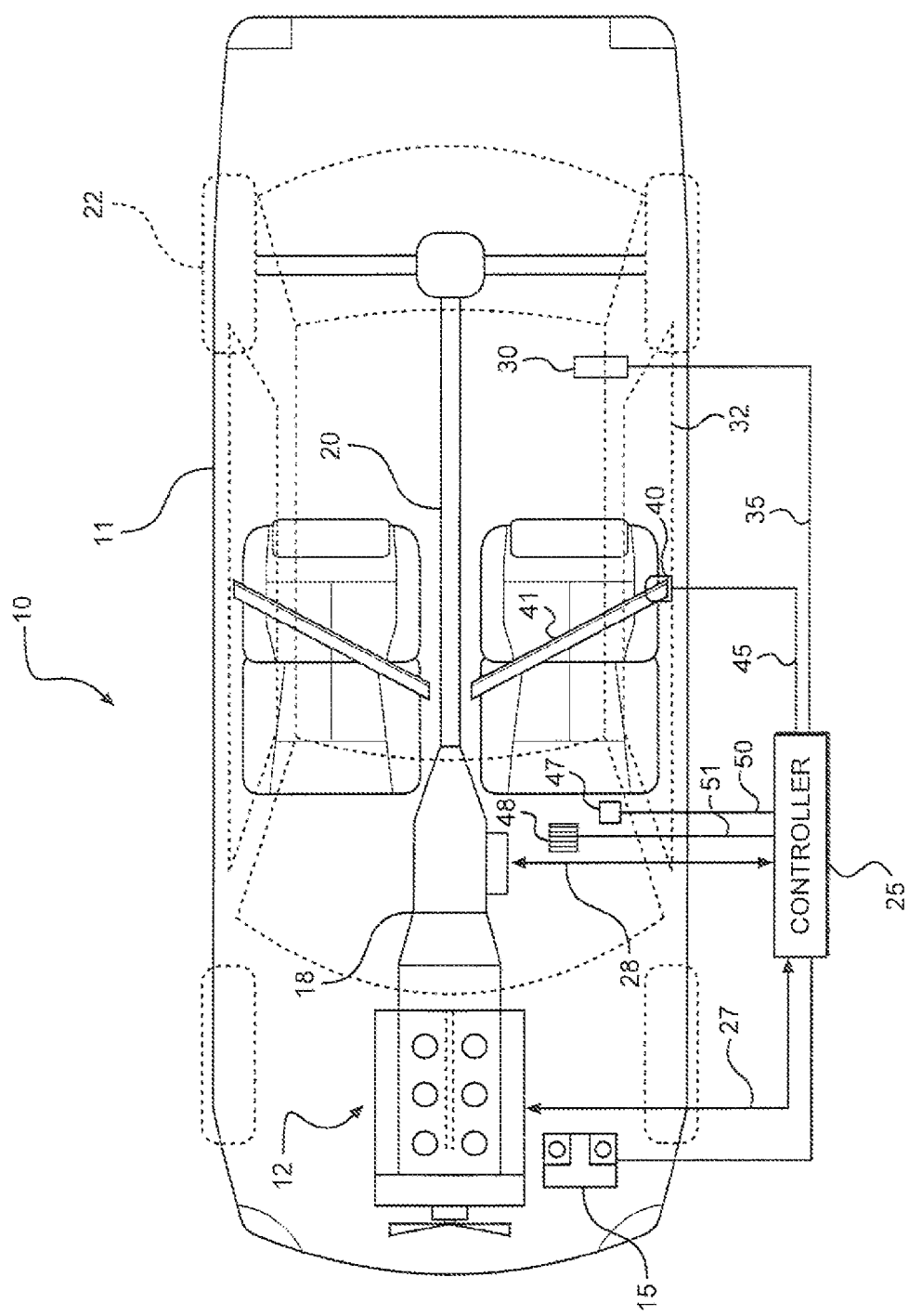
FIG. 1 is a diagram showing a vehicle incorporating a system for providing a Neutral Tow mode in a shift-by-wire transmission in accordance with the invention.

With initial reference to FIG. 1, there is shown an automotive vehicle 10 having a body 11 and an engine 12 with a battery 15. Power from engine 12 is transmitted to a transmission 18, then to the other portions of a powertrain 20 and eventually to drive wheels 22. Vehicle 10 is shown as a rear wheel drive vehicle but any type of powertrain arrangement, including front wheel or all wheel drive systems, could be employed. In, addition, although engine 12 is shown as an internal combustion engine, other types of drive arrangements, including hybrid drive systems, could be utilized. A controller 25 is connected to engine 12 and transmission 18 by communication lines 27 and 28 respectively. Controller 25 uses inputs from several sources to obtain information used to control engine 12 and transmission 18. For example, controller 25 is connected to a driver door sensor 30, for determining if a driver door 32 is open, by communication line 35. A seat belt sensor, 40 determines if a seat belt 41 is fastened and is also connected to controller 25 through a communication line 45. An ignition switch 47 and a brake sensor 48 are connected to controller 25 through lines 50 and 51 respectively.

Figure 2:
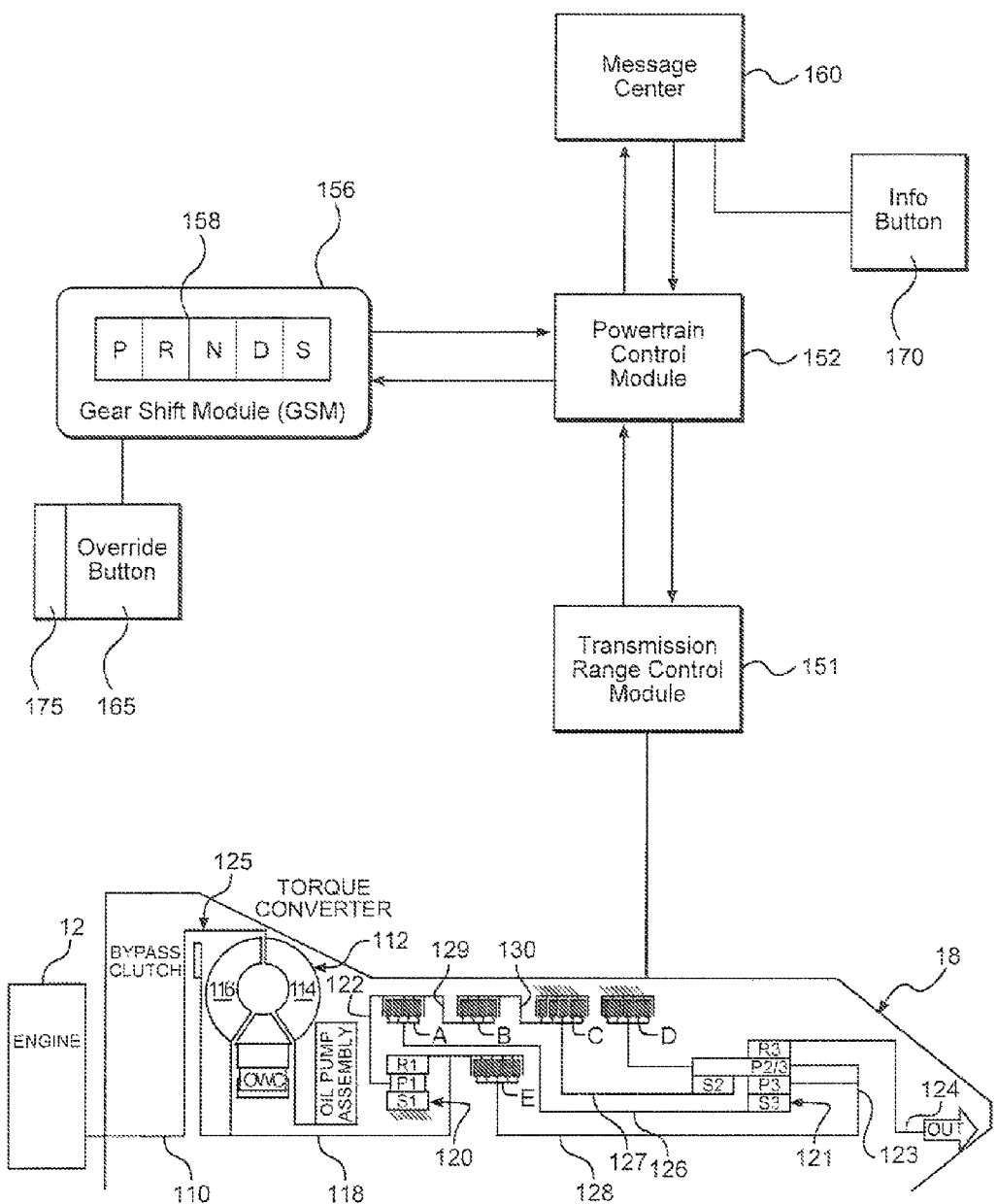
FIG. 2 is a basic schematic diagram of the system in FIG. 1.

FIG. 2 shows more details of transmission 18, which is an example of a multiple-ratio transmission wherein ratio changes are controlled by friction elements acting on individual gear elements. Engine torque from engine 12 is distributed to torque input element 110 of hydrokinetic torque converter 112. An impeller 114 of torque converter 112 develops turbine torque on a turbine 116 in a known fashion. Turbine torque is distributed to a turbine shaft, which is also transmission input shaft; 118. Transmission 18 is shown to include a simple planetary gearset 120 and a compound planetary gearset 121. Gearset 120 has a permanently fixed sun gear S1, a ring gear R1 and planetary pinions P1 rotatably supported on a carrier 122. Transmission input shaft 118 is drivably connected to ring gear R1. Compound planetary gearset 121, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3. Short planetary pinions P3 further engage sun gear S3. Planetary pinions P 2/3, P3 of gearset 21 are rotatably supported on compound carrier 123. Ring gear R3 is drivably connected to a torque output shaft 124, which is drivably connected to vehicle traction wheels 22 through powertrain 20 shown in FIG. 1. Gearset 120 is an underdrive ratio gearset arranged in series with respect to compound gearset 121. Typically, transmission 18 preferably includes a lockup or torque converter bypass clutch, as shown at 125, to directly connect transmission input shaft 118 to engine 12 after a torque converter torque multiplication mode, is completed, and a hydrokinetic coupling mode begins.

FIG. 2 also shows a transmission range control module 151 and a powertrain control module 152 which collectively constitute controller 25. Transmission range control module 151 is connected to transmission 18 by a shift cable (not labeled). Transmission range control module 151 replaces a mechanical shifter that was used to shift transmission from one range to another. A transmission control mechanism such as Gear Shift Module 156 is provided to select a transmission shift range. One possible implementation would be various buttons 158 each representing a different transmission range. The Gear Shift Module 156 is used to select several ranges, such as Park where the transmission output is locked to prevent vehicle 10 from moving, Neutral where the transmission allows vehicle 10 to be moved freely, such as when being towed, Reverse where transmission 18 allows vehicle 10 to move backwards, and one or more Drive ranges that enable forward motion of vehicle 10. Gear Shift Module 156 is also shown to include a Sport range. The Sport range is similar to the Drive range but will cause transmission 18 to shift forward ratios based on input from upshift and downshift switches (not show) actuated by the driver. Gear Shift Module buttons 158 are labeled with letters generally corresponding to the several transmission ranges and as such "P", "R", "N", "D", and "S" are shown in FIG. 2. Once transmission 18 has entered one of the ranges, a message center 160 shows the driver which range was entered. Additionally, Gear Shift Module 156 accepts signals from an override button 165 that will enable shifting to a Neutral Tow mode in emergencies and an info button 170, which causes message center 160 to provide additional information to the driver. Preferably, override button 165 has a cover 175 that protects override button 165 from accidentally being pushed.

The Park setting, can preferably be entered in many ways. In particular, the driver can select Park by pushing the "P" button and powertrain control module 152 then checks to see if vehicle 10 is traveling below an extremely low speed or stationary and, if so, instructs transmission control module 151 to shift transmission 18 into Park. Alternatively, when the driver ignition switch is turned to off, engine 12 powertrain control module 152 automatically instructs transmission control module 151 to shift transmission 18 into Park, thus enabling a "Return to Park" feature. Similarly, when the driver opens door 32 after unbuckling belt 41, sensors 30 and 40 will signal powertrain control module 152 which automatically instructs transmission control module 51 to shift transmission 18 into Park, thus once again enabling a "Return to Park" feature. The Reverse setting is entered by pushing the button labeled "R", at which point powertrain control module 152 automatically instructs transmission control module 151 to shift transmission 18 into Reverse, thus enabling vehicle 10 to move backward. In the transmission embodiment shown, the Reverse setting is established by applying low-and-reverse brake D and friction element B. The Neutral setting is entered by a single push of the "N" button on gear shift control module 156 or by a push of the "P" button when vehicle 10 is traveling too fast to safely enter the Park mode. In either case, powertrain control module 152 instructs transmission control module 151 to shift transmission 18 into Neutral and transmission 18 allows wheels 22 to rotate freely.

The Drive or Sport settings are entered by a single push of the "D" or "S" buttons respectively. Optionally, a Low or "L" setting (not shown) can be made available, to keep transmission 18 in low gears during forward motion of vehicle 10. When in Drive in the exemplary transmission shown, during operation in the first four forward driving ratios, carrier P1 is drivably connected to sun gear S3 through shaft 126 and forward friction element A. During operation in the third ratio, and fifth ratio, direct friction element B drivably connects carrier 22 to shaft 127, which is connected to large pitch diameter sun gear S2. During operation in the fourth, fifth and sixth forward driving ratios, overdrive friction element E connects turbine shaft 118 to compound carrier 123 through shaft 128. Friction element C acts as a reaction brake, for sun gear S2 during operation in second and sixth forward driving ratios. During operation of the third forward driving ratio, direct friction element B is applied together with forward friction element A. The elements of gearset 121 then are locked together to effect a direct driving connection between, shaft 128 and output shaft 126. The torque output side of forward friction element A is connected through torque transfer element 129 to the torque input side of direct friction element B during forward drive. The torque output side of direct friction element B, during forward drive, is connected to shaft 127 through torque transfer element 130. More details of this type of transmission arrangement are found in U.S. Pat. No. 7,216,025, which is hereby incorporated by reference.

Figure 3:
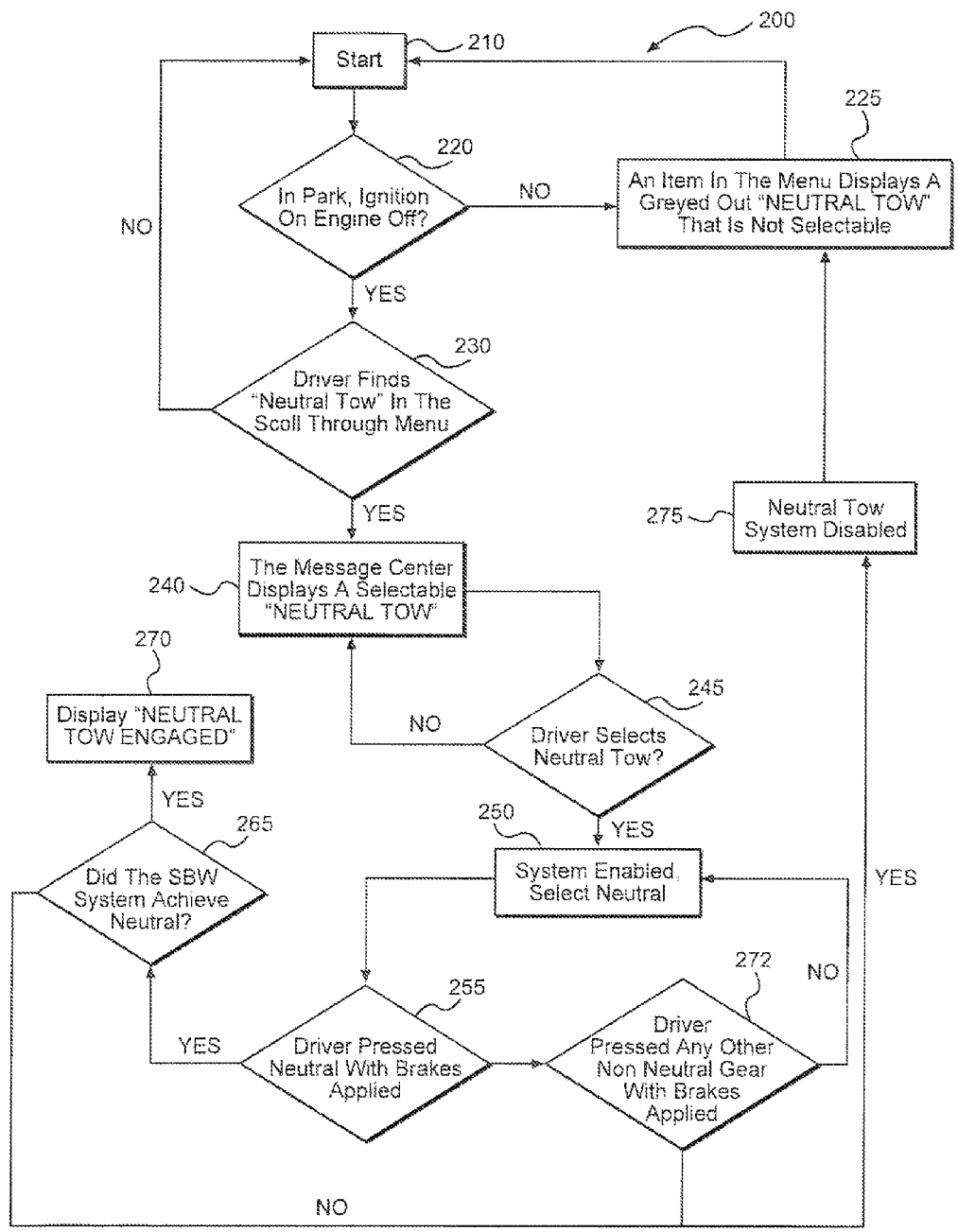
FIG. 3 is a flowchart showing a control routine employed in the system of FIG. 1 used to enter the Neutral Tow mode according to a preferred embodiment of the invention.

FIG. 3 is a flow chart showing a preferred method 200 of entering a Neutral Tow mode in accordance with the invention. Generally, the Neutral Tow mode is entered with engine 12 off, ignition switch 47 on and input through a menu driven display. When vehicle 10 is in Neutral Tow mode, the Return to Park functions are deactivated. Additionally, message center 160 will enter a sleep mode so as to not drain battery 15, which enables vehicle 10 to be towed over long distances. Preferred method 200 of entering Neutral Tow starts at step 210 and is implemented by controller 25. Next, at step 220, controller 25 checks to determine if vehicle 10 is in Park, ignition switch 47 is on and, engine 12 is off. If not, controller 25 displays a greyed out or otherwise distinguished Neutral Tow option at 225 and simply returns to step 210. Otherwise, controller 25 proceeds to step 230 where the driver scrolls through a menu in message center 160 and then controller 25 displays a Neutral Tow mode option that is selectable at 240. Controller 25 determines whether or not the driver selects the Neutral Tow option at 245 and, if so, then controller 25 enters Neutral Tow mode at 250 and Default to Park or Return to Park features are disabled. As such, transmission 18 will stay in Neutral and not automatically shift to Park upon detecting a triggering event, such as releasing brake 48, turning off ignition switch 47, or sensing a driver has released seat belt 41. Displaying the Neutral Tow option at step 240 also occurs upon detecting that a parking brake 48 is on or upon detecting that information button 170 has been pushed. Controller 25 then checks to see if the "N" button was pressed with brake pedal 48 pressed and, if these actions are positive, proceeds to step 265 to check to see if the shift-by-wire system achieved Neutral and controller 25 instructs message center 160 to show the message "NEUTRAL TOW ENGAGED" or some other similar message to let the driver know that "Neutral Tow' mode has been successfully entered at step 270. If the any other button is pressed with the brakes applied other than the Neutral button "N" (step 272), then Neutral Tow mode is disabled at step 275. Similarly; if at step 265, the shift-by-wire system does not achieve, neutral again, Neutral Tow mode is disabled at step 275 and Controller 25 returns to step 225. Again, message center 160 is preferably powered down to allow long distance towing without draining battery 15 and is then'active for a limited time when the Neutral Tow mode is entered, door 32 is opened or ignition switch 47 is turned off.

Figure 4:
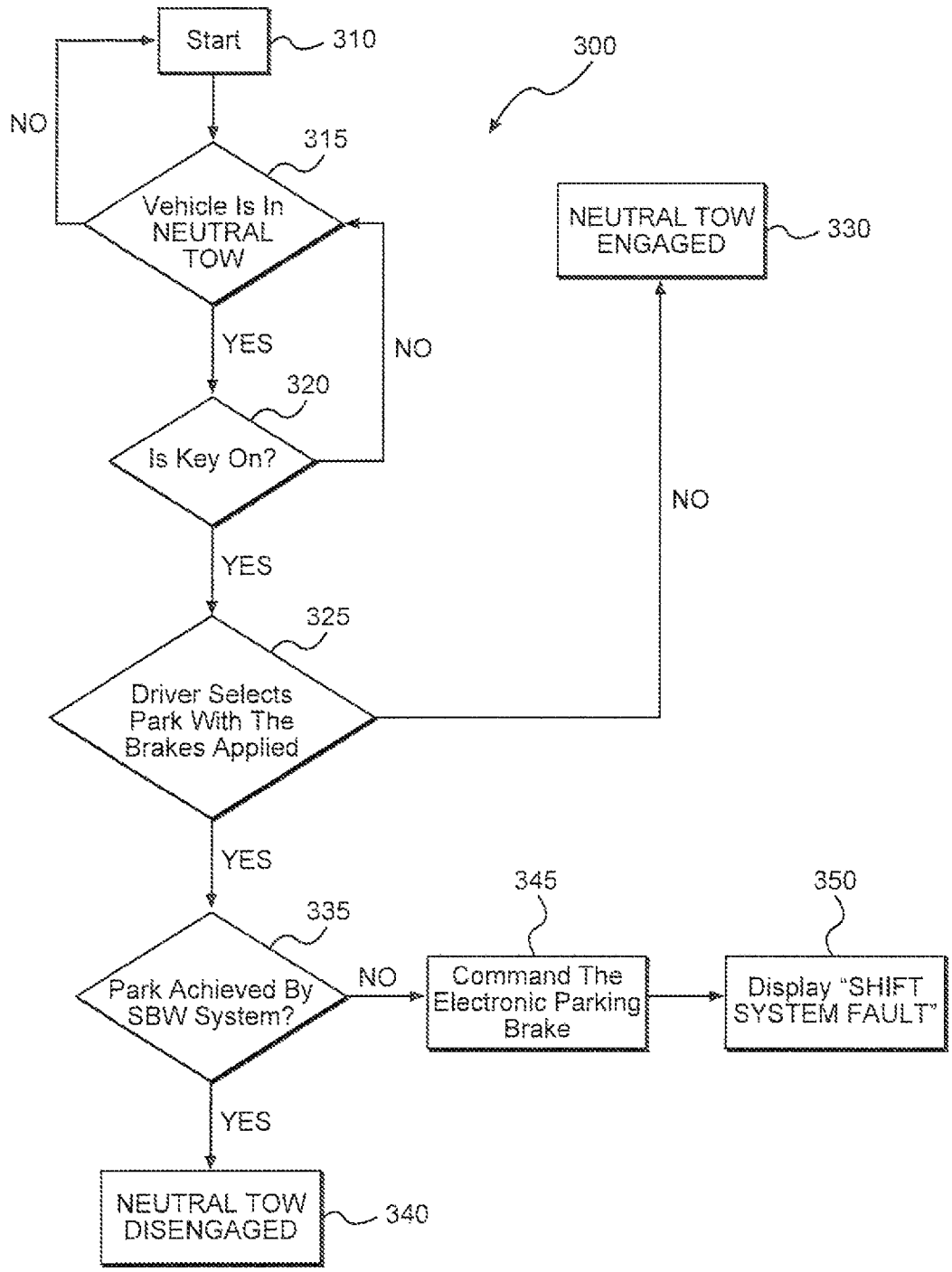
FIG. 4 is a flowchart showing a control routine employed in the system of FIG. 1 used to exit the Neutral Tow mode according to another preferred embodiment.

FIG. 4 shows a preferred method 300 of exiting Neutral Tow mode upon detecting a certain sequence of events. From starting step 310', controller 25 then checks at step 315 to determine if vehicle 10 is in Neutral Tow mode. If vehicle 10 is not in Neutral Tow mode, then controller 25 returns to step 310. If vehicle 10 is in Neutral Tow mode, then controller 25 determines if ignition switch 47 is "on" at step 320. If ignition switch 47 is "on" at 320, controller 25 then checks to see if Park button "P" has been pushed with brakes applied at step 325. If not, the Neutral Tow mode is maintained engaged. Otherwise, controller 25 proceeds to step 335 to determine if shift-by-wire transmission 18 has achieved Park at which point Neutral Tow mode is disengaged (340) whereupon message center 160 displays a message indicating that the Neutral Tow mode has been canceled. Otherwise, controller 25 commands engagement of an electronic parking brake at 345 and displays "SHIFT SYSTEM FAULT" or some other similar message on message center 160 at step 350. With this preferred method, the driver may exit vehicle 10 and not have transmission 18 automatically return to Park. Furthermore, vehicle 10 can be towed long distances without battery 15 being drained.

Although described with reference to a preferred embodiment of the invention, it should be readily understood that various changes and/or modifications could be made to the invention without departing from the spirit thereof. For instance, numerous minor variations to the preferred methods of entering and exiting Neutral Tow could be made without changing the inventive concept. In addition, although push buttons are employed in the disclosed embodiments, various other selecting arrangements including numerous switches could also be employed. In general, the invention is only intended to be limited by the scope of the following claims.

The invention claimed is:

1. A method of providing a neutral tow mode in a shift-by-wire transmission having an automatic return to Park feature in a vehicle, comprising:
    displaying a neutral tow mode option; and
    entering a neutral tow mode by selecting the displayed neutral tow mode option wherein the transmission will stay in Neutral and not automatically shift to Park upon detecting a triggering event.

2. The method of claim 1, wherein displaying the neutral tow option occurs upon detecting that a transmission control mechanism has been used to select Park when an ignition switch is on and an engine is off.

3. The method of claim 2, wherein displaying the neutral tow option occurs upon detecting that a parking brake is on.

4. The method of claim 3, wherein displaying the neutral tow option occurs upon detecting that an information button has been pushed.

5. The method of claim 1, wherein entering the neutral tow mode occurs upon detecting when the neutral tow option has been selected.

6. The method of claim 5, wherein entering the neutral tow mode occurs upon detecting that a foot brake has been depressed.

7. The method of claim 6, wherein entering the neutral tow mode occurs upon detecting that the transmission has been shifted to Neutral.

8. The method of claim 1, wherein the triggering event is constituted by a parking brake being released.

9. The method of claim 1, wherein the triggering event is constituted by an ignition switch being turned off.

10. The method of claim 1, wherein the triggering event is constituted by a driver seat belt being released.

11. The method of claim 1, further comprising: displaying that the neutral tow mode is active, only for a limited amount of time, when the neutral tow mode is entered, a door to the vehicle is opened, or an ignition switch is turned on so that power is not drained from the vehicle.

12. The method of claim 1, further comprising: canceling the neutral tow mode upon detecting a sequence of events, wherein the sequence of events includes at least two of the group consisting of: turning on an ignition switch; depressing and holding a brake pedal; and selecting Park.

13. The method of claim 1, further comprising: displaying that the neutral tow mode has been canceled.

14. A system for providing a neutral tow mode in a vehicle including an ignition switch, an engine, a parking brake, an information request switch, a door and a shift-by-wire transmission having an automatic return to Park feature comprising:
    a transmission control mechanism for controlling the transmission;
    a detector for detecting when the transmission control mechanism has been used to select neutral;
    a display for displaying a neutral tow option when the transmission control mechanism has been used to select Park, the ignition switch is on, and when either the engine is off or the information request switch has been pushed; and
    a controller configured to enter the neutral tow mode wherein the controller will maintain the shift-by-wire transmission in Neutral and not automatically shift to Park upon detecting a triggering event.

15. The system of claim 14, wherein the controller is further configured to enter the neutral tow mode upon detecting when the neutral tow option has been selected.

16. The system of claim 14, wherein the controller is further configured to enter the neutral tow mode upon detecting when a foot brake has been depressed.

17. The system of claim 14, wherein the controller is further configured to enter the neutral tow mode upon detecting when the transmission has been shifted to Neutral.

18. The system of claim 14, wherein the triggering event is one of the group consisting of: parking brake has been released, an ignition switch has been turned off, and a driver has exited the vehicle.

19. The system of claim 14, wherein the display is configured to indicate that the neutral tow mode is active, only for a limited amount of time, after the neutral tow mode is entered, the door is opened, or the ignition switch is turned on so that power is not drained from the vehicle.

20. The system of claim 14, wherein the controller is further configured to cancel the neutral tow mode upon detecting a sequence of events wherein the sequence of events includes at least two of the group consisting of: turning on the ignition switch, depressing and holding a brake pedal; and selecting Park.

* * * * *